(12) United States Patent
McGlothlin et al.

(10) Patent No.: US 7,205,891 B1
(45) Date of Patent: Apr. 17, 2007

(54) REAL-TIME WIRELESS VIDEO EXPOSURE MONITORING SYSTEM

(75) Inventors: James D. McGlothlin, West Lafayette, IN (US); Ryan M. Traylor, Dale, IN (US); John W. Leimgruber, Tell City, IN (US)

(73) Assignee: Purdue Research Foundation, West Lafayette, IN (US)

( * ) Notice: Subject to any disclaimer, the term of this patent is extended or adjusted under 35 U.S.C. 154(b) by 196 days.

(21) Appl. No.: 10/945,533

(22) Filed: Sep. 20, 2004

Related U.S. Application Data

(60) Provisional application No. 60/504,533, filed on Sep. 19, 2003.

(51) Int. Cl.
*G08B 1/08* (2006.01)
*H04Q 7/00* (2006.01)

(52) U.S. Cl. ............ 340/539.26; 340/539.29; 340/539.25; 340/600; 725/12; 348/143

(58) Field of Classification Search ........... 340/521, 340/539.26
See application file for complete search history.

(56) References Cited

U.S. PATENT DOCUMENTS

| | | | |
|---|---|---|---|
| 3,663,821 A | 5/1972 | Finkle | |
| 4,827,414 A | 5/1989 | Christianson et al. | |
| 5,157,703 A | 10/1992 | Wolf | |
| 5,173,609 A | 12/1992 | Lacoste et al. | |
| 5,256,878 A | 10/1993 | LeVert | |
| 5,324,948 A | 6/1994 | Dudar et al. | |
| 5,572,027 A | 11/1996 | Tawil et al. | |
| 5,689,442 A | 11/1997 | Swanson et al. | |
| 5,790,977 A | 8/1998 | Ezekiel | |
| 5,841,142 A | 11/1998 | Duftschmid et al. | |
| 5,956,487 A | 9/1999 | Venkatraman et al. | |
| 6,023,223 A | 2/2000 | Baxter, Jr. | |
| 6,031,454 A * | 2/2000 | Lovejoy et al. | 340/539.29 |
| 6,069,653 A | 5/2000 | Hudson | |
| 6,281,790 B1 | 8/2001 | Kimmel et al. | |
| 6,282,410 B1 * | 8/2001 | Monsen et al. | 340/539.14 |

(Continued)

OTHER PUBLICATIONS

E. R. Vivoni et al., "Real-Time Streaming of Environmental Field Data," Computers & Geosciences, vol. 29, 2003, pp. 457-468.

(Continued)

*Primary Examiner*—Daniel Wu
*Assistant Examiner*—Eric M. Blount
(74) *Attorney, Agent, or Firm*—William F. Bahret

(57) ABSTRACT

A real-time wireless video exposure monitoring system comprising an exposure monitor, located at a field site, which detects the level of an environmental contaminant and supplies corresponding data via a serial data port to a serial-to-wireless bridge for real-time wireless transmission of the data to a wireless Internet access point. The system includes a video camera at the field site and a wireless video connection for transmitting video images from the video camera in real time to the wireless Internet access point. A client computer, which may be at a central station at a distant location, is adapted to connect via the Internet to the wireless bridge and the wireless video connection so as to receive real-time contaminant level data and real-time video, the client computer configured to provide real-time data recording and analysis.

14 Claims, 4 Drawing Sheets

U.S. PATENT DOCUMENTS

| | | | |
|---|---|---|---|
| 6,317,639 B1 * | 11/2001 | Hansen | 700/83 |
| 6,388,259 B1 | 5/2002 | Murdock | |
| 6,492,957 B2 | 12/2002 | Carillo et al. | |
| 6,633,327 B1 | 10/2003 | Williams et al. | |
| 6,690,411 B2 | 2/2004 | Naidoo et al. | |
| 6,700,605 B1 | 3/2004 | Toyoda et al. | |
| 6,714,977 B1 * | 3/2004 | Fowler et al. | 709/224 |
| 6,735,630 B1 | 5/2004 | Gelvin et al. | |
| 6,741,174 B2 * | 5/2004 | Rhoades et al. | 340/540 |
| 6,798,343 B2 * | 9/2004 | Carrier et al. | 340/539.13 |
| 6,930,599 B2 | 8/2005 | Naidoo et al. | |
| 6,946,671 B2 * | 9/2005 | Smith et al. | 250/559.4 |
| 6,970,183 B1 | 11/2005 | Monroe | |
| 6,975,220 B1 | 12/2005 | Foodman et al. | |
| 6,977,585 B2 | 12/2005 | Falk et al. | |
| 6,987,528 B1 | 1/2006 | Nagahisa et al. | |
| 6,989,745 B1 * | 1/2006 | Milinusic et al. | 340/521 |
| 7,005,982 B1 * | 2/2006 | Frank | 340/539.26 |
| 7,009,510 B1 * | 3/2006 | Douglass et al. | 340/521 |
| 2002/0032689 A1 | 3/2002 | Abbott et al. | |
| 2002/0144537 A1 | 10/2002 | Sharp et al. | |
| 2002/0180606 A1 | 12/2002 | Kitaguchi et al. | |
| 2003/0025599 A1 * | 2/2003 | Monroe | 340/521 |
| 2003/0035386 A1 * | 2/2003 | Sullivan | 370/316 |
| 2003/0154055 A1 | 8/2003 | Yoshimura | |
| 2003/0154056 A1 | 8/2003 | Ito et al. | |
| 2004/0056196 A1 | 3/2004 | Yoshida et al. | |
| 2005/0109939 A1 | 5/2005 | Engler et al. | |
| 2005/0251339 A1 | 11/2005 | Araki et al. | |
| 2006/0001537 A1 | 1/2006 | Blake et al. | |

OTHER PUBLICATIONS

Rosen et al., "Concurrent Video Filming and Measuring for Visualization of Exposure," *American Industrial Hygiene Association Journal*, vol. 48, Aug. 1987, pp. 688-692.

McGlothlin, et al., "Dust Control by Ergonomic Design," *Proceedings 1Xth International Conference on Production Research*, Cincinnati, OH, Aug. 17-20, 1987, pp. 687-694.

Kovein et al., "Real-Time Personal Monitoring in the Workplace Using Radio Telemetry," *Applied Occupational and Environmental Hygiene*, vol. 7, No. 3, Mar. 1992, pp. 168-173.

Gressel et al., "Video Exposure Monitoring—A Means of Studying Sources of Occupational Air Contaminant Exposure, Part 1—Video Exposure Monitoring Techniques," *Applied Occupational and Environmental Hygiene*, vol. 8, No. 4, Apr. 1993, pp. 334-338.

Heitbrink et al., "Video Exposure Monitoring—A Means of Studying Sources of Occupational Air Contaminant Exposure, Part 2—Data Interpretation," *Applied Occupational and Environmental Hygiene.*, vol. 8, No. 4, Apr. 1993, pp. 339-343.

Walsh et al., "Computer-Aided Video Exposure Monitoring," *Applied Occupational and Environmental Hygiene*, vol. 15, No. 1, 2000, pp. 48-56.

Voskicky, "The Development, Assembly, and Pilot Testing of a Task-Based Video Exposure Assessment System," Master of Science Thesis, Purdue University, West Lafayette, Indiana, Aug. 2000, pp. 19-30.

Protopapas, "Videography With Comparative Analyses of Real-Time Monitoring Versus Diffusive Monitoring to Control Methylene Chloride in an Industrial Setting," Master of Science Thesis, Purdue University, West Lafayette, Indiana, Aug. 2000, pp. 11-28.

Roggenbauer et al., "Development and Use of a Radio-Telemetry Video Exposure Monitoring System to Identify and Control Airborne Particulate Exposures," American Industrial Hygiene Conference and Exposition, New Orleans, Louisiana, Jun. 6, 2001 (poster) (1 page).

Roggenbauer et al., "Development and Use of a Radio-Telemetry Video Exposure Monitoring System to Identify and Control Airborne Particulate Exposures at a Chemical Manufacturing Facility," slide presentation to Eli Lilly Tippecanoe facility employees, Jun. 12, 2001 (11 pages).

Roggenbauer, "Development and Use of a Radio-Telemetry Video Exposure Monitoring System to Identify and Control Airborne Particulate Exposures in a Pharmaceutical Manufacturing Facility," Master of Science Thesis, Purdue University, West Lafayette, Indiana, Aug. 2001, pp. 1-6.

* cited by examiner

US 7,205,891 B1

REAL-TIME WIRELESS VIDEO EXPOSURE MONITORING SYSTEM

CROSS-REFERENCE TO RELATED APPLICATION

This application claims the benefit of the filing date of Provisional Application No. 60/504,533, filed Sep. 19, 2003, which application is hereby incorporated by reference along with all patent applications cited therein.

BACKGROUND OF THE INVENTION

This invention relates to systems and methods for monitoring exposure to environmental contaminants, and more particularly to real-time exposure monitoring systems and methods.

Real-time instrumentation has been combined with the use of video to perform exposure assessments in the past, e.g., assessments of exposure to air contaminants as described, for example, by James D. McGlothlin et al. in "Dust Control by Ergonomic Design," *Proceedings IXth International Conference on Production Research,* 687–694 (1987), and by Michael G. Gressel et al. in "Video Exposure Monitoring—A Means of Studying Sources of Occupational Air Contaminant Exposure, Part I—Video Exposure Monitoring Techniques," *Applied Occupational and Environmental Hygiene* 8(4): 334–338 (1993). However, all known environmental exposure monitoring systems have limitations on their efficiency and effectiveness, and thus there remains a need for improvements in systems and methods for monitoring exposure.

More specifically, better ways are needed to protect workers from potential overexposure to environmental contaminants such as particulates and solvent vapor, among others things, in pharmaceutical and other processing operations. It is desirable but impractical to monitor worker activities in many field settings, for example, and thus a need remains for better ways to allow health physicists and others to understand the nature of conditions at remote locations. It is necessary to know which specific task elements during a job operation lead to the greatest exposure in order to effectively train employees to utilize good practices that will minimize the exposure. A related need exists in the United States for more efficient and reliable systems for providing verification for the Food and Drug Administration's Good Manufacturing Practices.

SUMMARY OF THE INVENTION

According to one aspect thereof, the present invention provides a real-time wireless video exposure monitoring system which includes an exposure monitor adapted to detect the level of an environmental contaminant, a local microcontroller for acquiring real-time contaminant level data and transmitting the data on a wireless data communications network, e.g., the Internet, a video camera adapted to transmit streaming video on the network, and a client computer, which may be at a central monitoring location remote from the exposure monitor, configured to receive the real-time contaminant level data and streaming video transmitted on the network and to perform real-time data recording and analysis.

A novel method according to the present invention allows remote monitoring of exposure to an environmental contaminant in real time. The method involves detecting the level of an environmental contaminant with a sensor at a field site, supplying real-time contaminant level data from the sensor to a local microcontroller, transmitting the real-time contaminant level data from the microcontroller on a wireless data communications network to a client computer remote from the field site, obtaining video images of the field site, transmitting the video images in real time on the network to the client computer, and recording and simultaneously displaying the contaminant level data and video images in the client computer.

In a real-time wireless video exposure monitoring system according to another aspect of the invention, an exposure monitor located at a field site detects the level of an environmental contaminant and supplies corresponding data via a serial data port to a wireless bridge for real-time wireless transmission of the data to a wireless Internet access point. The system includes a video camera at the field site and a wireless video connection for transmitting video images from the video camera in real time to the wireless Internet access point. A client computer is adapted to connect via the Internet to the wireless bridge and the wireless video connection so as to receive real-time contaminant level data and real-time video, the client computer configured to provide real-time data recording and analysis.

Objects and advantages of the present invention will be more apparent upon reading the following detailed description in conjunction with the accompanying drawings.

DESCRIPTION OF PREFERRED EMBODIMENTS

Figure 1:
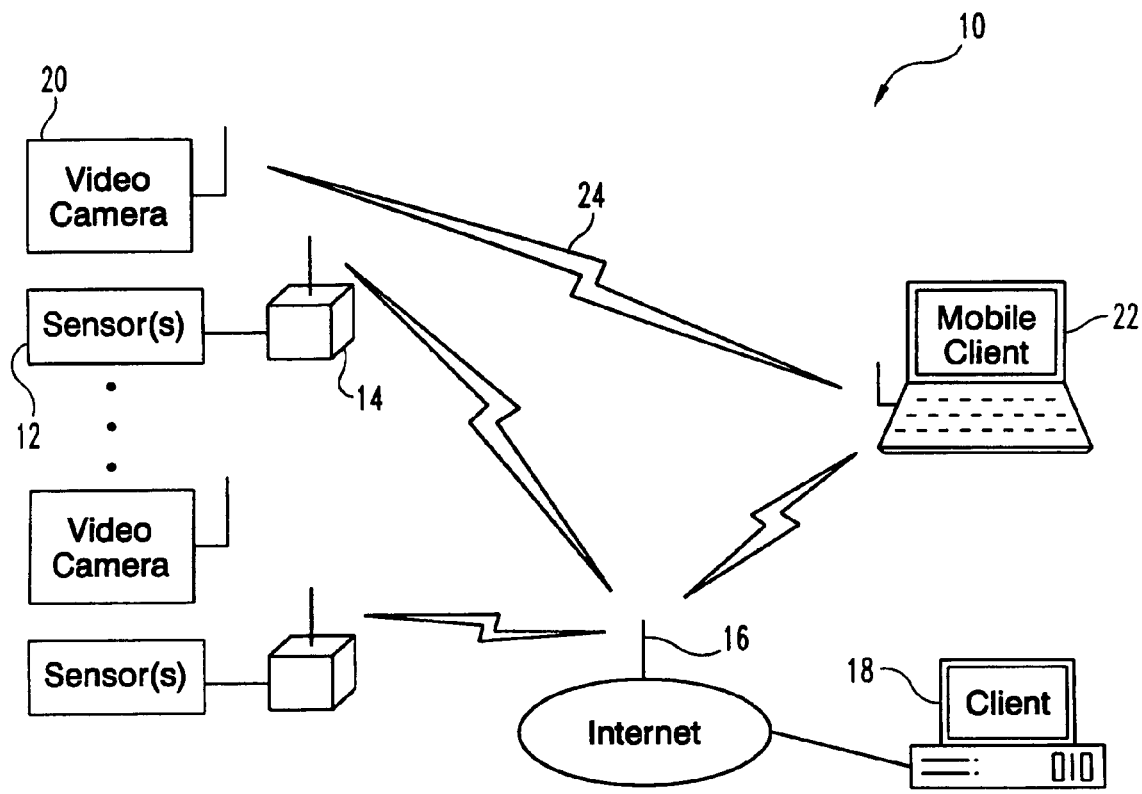
FIG. 1 is a block diagram of one embodiment of a real-time wireless network-enabled video exposure monitoring system according to the present invention.

For the purpose of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device and such further applications of the principles of the invention as illustrated therein being contemplated as would normally occur to one skilled in the art to which the invention relates.

Referring to FIG. 1, a first embodiment of a system 10 according to the present invention includes one or more sensors 12 paired with a video camera 20 at one or more field sites which may be within a plant such as a pharmaceutical plant or may be outdoor sites. The sensors or monitoring devices in this embodiment enable data acquisition, e.g., acquisition of the level of particulates or other environmental contaminant, and have a serial interface, e.g., RS232, RS422 or RS485. Each sensor may be connected to its own serial-to-wireless bridge 14, although it is also contemplated that multiple sensors may share a wireless bridge. One type of sensor suitable for use in a system designed to monitor exposure to particulates, for example, is a Thermo Electron Data Ram 4 Model DR-4000 particulate sensor. Another sensor contemplated as part of this embodiment is noise level detector, e.g., a Quest Model 2900 integrating/logging sound level meter.

The wireless bridges 14 provide LAN and Internet connectivity for RS232 and similar serial output devices. More specifically, the bridges provide a connection between the serial ports of the sensors and a wireless network, and thereby enable wireless transmission of contaminant level data from the sensors to a wireless Internet access point 16, through which the data can be transmitted over the Internet to a client computer 18 at a central monitoring station which may be anywhere in the world where Internet access is available. One suitable serial-to-wireless bridge, commercially available from DPAC Technologies, is the Airborne-Direct™ serial bridge.

As shown in FIG. 1, the system preferably also includes at least one network-enabled video camera 20 located at a given field site and positioned to view a point or points of interest from an environmental exposure standpoint, e.g., a powder mixing station in a pharmaceutical plant. Two examples of suitable video cameras, both available from Axis Communications, are the Axis 2130 PTZ network camera, which has pan, tilt and zoom capability, and the Axis 206W wireless network camera with a built-in Wi-Fi 802.11b wireless connection. The Axis 2130 PTZ camera is connected to an Ethernet-to-wireless bridge, such as a D-Link DWL-810+ wireless bridge or a Netgear ME101 wireless Ethernet bridge, to enable real-time wireless transmission of video images from the video camera to the wireless access point, which may comprise a wireless router such as a Netgear MR814 router. Each video camera is assigned a unique IP address that, like that of each wireless bridge 14, can be accessed worldwide via the Internet by multiple users simultaneously.

Current sensor readings are sent in TCP/IP packets across the network to the client computer. TCP/IP is the presently preferred protocol, but, alternatively, other protocols or combinations thereof suitable for transmitting data through a wired/wireless LAN or Internet could be used. The system may also include one or more mobile client computers 22, e.g., laptop computers or PDAs designed for field data acquisition and analysis/recording according to the principles of the present invention. Using these mobile computers, untethered mobile users can take advantage of the wireless networking capabilities to connect to sensors and network cameras via a wireless access point such as access point 16. In addition, or as an alternative for some applications, the mobile client computers may be configured to operate as part of an ad hoc network, i.e., for direct communications with a sensor and/or video camera as indicated by wireless link 24. As alluded to above, the system may also include wired LAN components, e.g., wired Ethernet devices, at field sites or elsewhere in the system.

Figure 2:
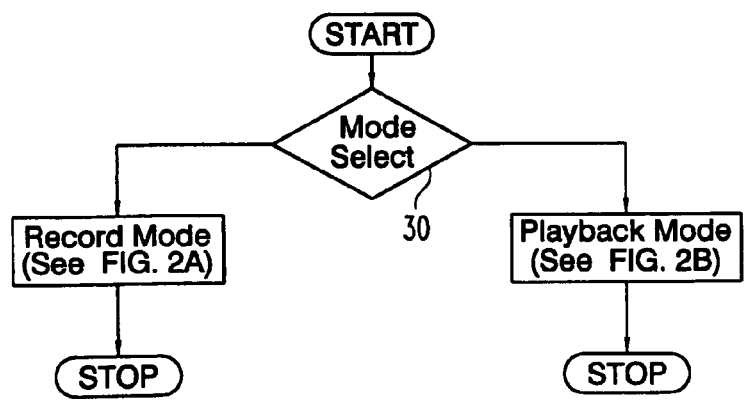
FIG. 2 is a flowchart of software for a client computer in the system of FIG. 1.
Figure 2A:
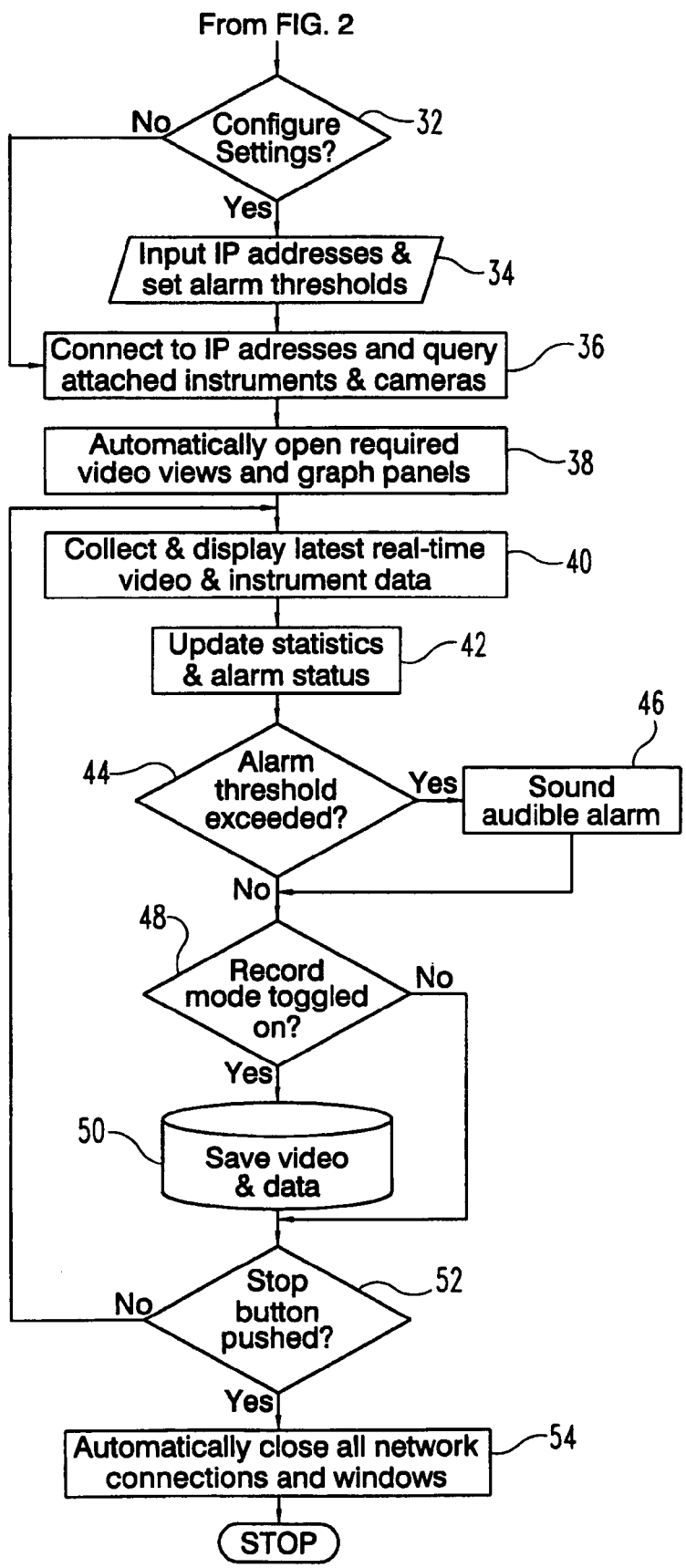
FIG. 2A is a flowchart of the Record Mode program of FIG. 2.

The software for the client computer will be described with reference to the flowchart of FIG. 2 and the more detailed flowcharts of the main branches thereof illustrated in FIGS. 2A and 2B. The system has a recording mode and a playback mode, and the user's selection is detected in step 30 after starting the program. The program branches to configuration step 32 (FIG. 2A) if recording mode is selected. In step 32, the program checks for a data file containing setup information, e.g., the IP address of each camera and sensor of interest, and an acceptable data range inside of which data should lie for each sensor. If no such data file is found, e.g., during the initial run of the program, the user is prompted, in step 34, with a dialog box in which the user inputs the IP addresses and desired alarm thresholds. The program allows the user to change this information at a later time by selecting the configure option from a menu. The information entered by the user is then saved to disk in a data file. If any data points exceed the specified ranges, an alarm status can be signaled.

If the data file is found in step 32, or after completion of input step 34, the program connects the client computer to the selected IP addresses and initiates an automatic detection mode to identify the attached instruments and cameras (step 36). The program sequentially steps through data request codes for a known set of compatible instruments. If a response is received from a device, the program compares it with a known set of responses for the request code that was sent. If there is a match, a compatible instrument has been detected and its occurrence saved in memory. The program then automatically opens required video views and graph panels (step 38), such as those shown on the right side of FIG. 3, and enters the main loop of the recording mode, which includes steps 40–52 in the flowchart.

Figure 3:
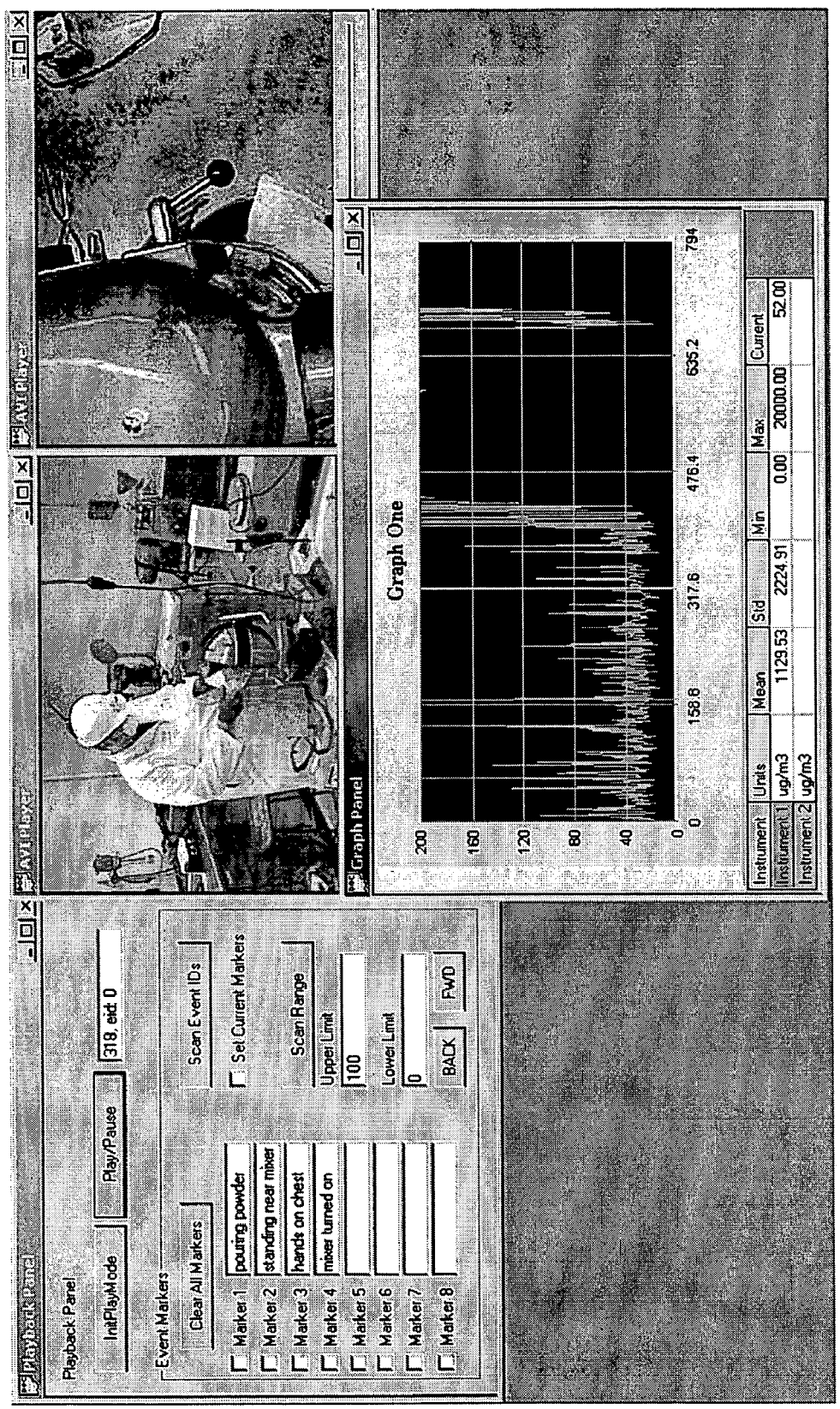
FIG. 3 is an example view of a graphical user interface (GUI) layout showing various component panels generated on the screen of a client computer according to one embodiment of the present invention.

The program preferably provides for a plurality of video display panels to be opened and connected to various network cameras, and likewise provides for a plurality of graph/statistics panels to be opened and positioned on the screen by the user. The program also makes a number of settings available to the user, including color of lines, number of instrument data streams per graph, axis labels, and titles. In addition, the program calculates the mean and standard deviation for a set of data values and displays that information along with the minimum, maximum and current values in a table such as shown in FIG. 3. Recursive formulas are used to allow calculation of the mean and standard deviation given only the previous mean and standard deviation values and the most recently received data value. Such formulas for time-average and time-variance calculations are available online, for example, at the following web site: http://people.revoledu.com/kardi/tutorial/RecursiveStatistic/Images.htm.

It will be understood that the steps illustrated may be executed in a different order than that shown and that some events may occur substantially simultaneously. For example, step 40 depicts the collection and display of the latest real-time video and instrument data. The client computer receives video from the network continually at a frame rate ranging from 1–30 frames per second, and simultaneously receives instrument data at a rate of, for example, one sample per second. All of the data is time-stamped and then displayed on-screen immediately for user viewing. The program calculates statistics concerning the incoming data as indicated above, and continually updates the statistics at step 42 as new data values arrive. If the user has enabled an alarm or alarms, the program checks each incoming data value against its respective threshold, in step 44, and sounds an alarm if the threshold is exceeded (step 46). It should be noted that the data ranges can be changed while the software is running and recording data, which provides a more flexible and dynamic monitoring capability.

Decision block 48, labeled "record mode toggled on," refers not to the mode selection of step 30 but to a toggle setting whereby the user can select whether or not to save incoming data. If this mode setting is toggled on, the video frames and data are saved to the computer hard disk in step 50. If not, the video and data are displayed but not saved. This feature is useful, for example, in a scenario where one main computer is used to view and save all the data to disk, while other simultaneous users might only be interested in viewing the real-time feed, realizing that the main computer is saving the data. The video may be saved in a compressed AVI (audio video interleave) format whereby both audio and video streams are supported in the same file. Alternatively, the video may be compressed and stored frame by frame with time stamps which may be used to synchronize video playback with data. The main recording loop continues unless the stop button is pushed (step 52), in which case the program automatically closes all network connections and windows in step 54 and then stops.

Figure 2B:
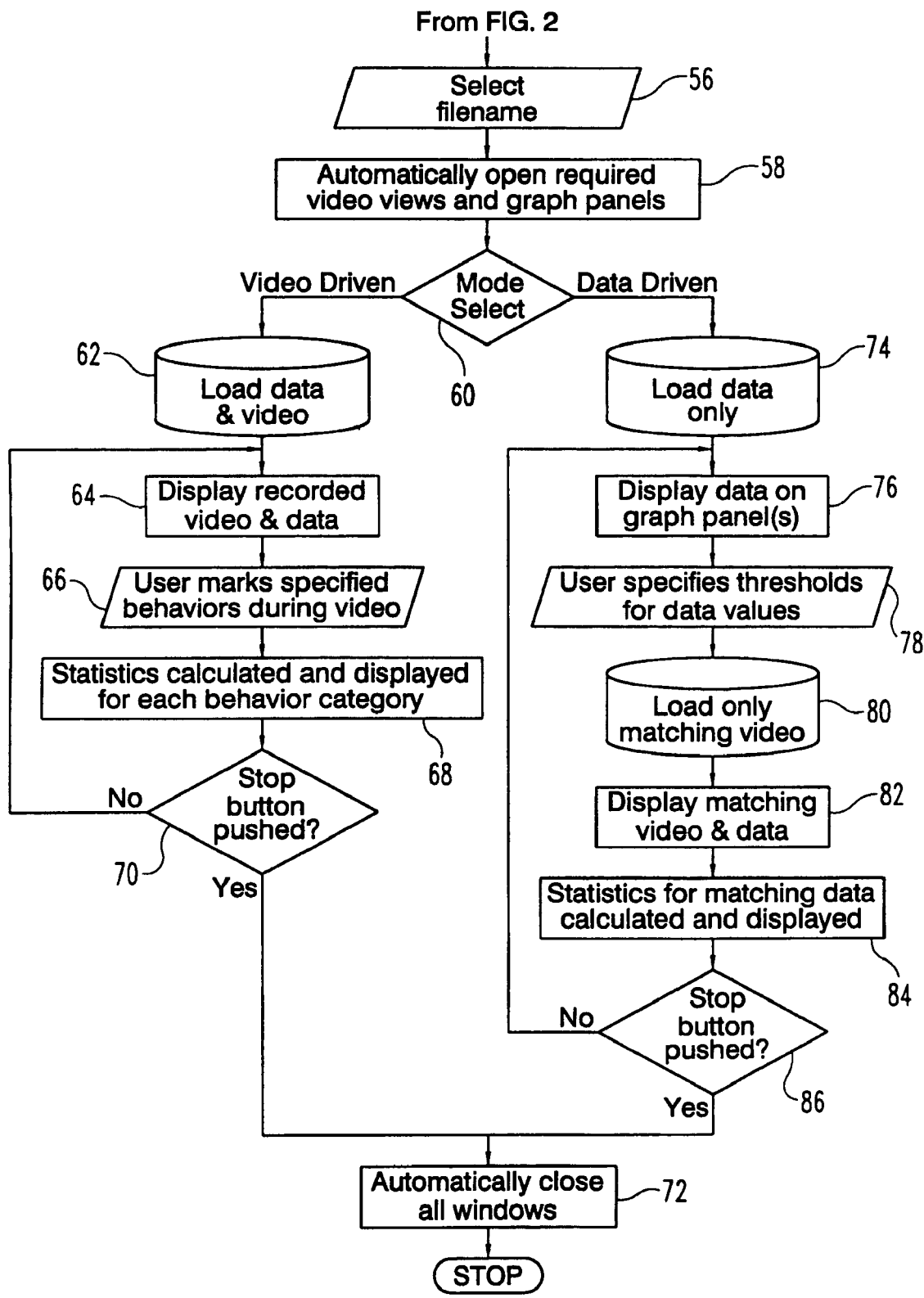
FIG. 2B is a flowchart of the Playback Mode program of FIG. 2.

Turning to FIG. 2B, playback mode begins with selection of a file name or names in step 56, in response to which the program automatically opens required video views and graph panels (step 58). The program then responds to another mode selection in step 60, branching either to video-driven display and analysis or to data-driven display and analysis depending on the user's selection. In the video-driven mode, which is useful for behavioral studies, data and video from the selected files are loaded (step 62) and displayed (step 64) for the user to mark specified behaviors during video playback (step 66). For example, referring to FIG. 3, the program may generate a playback panel, a dialog box with eight spaces for entry of marker titles corresponding to worker actions, e.g., pouring powder, mixer turned on, etc. In the example scene shown in the upper right of FIG. 3, a lab technician pours powder into a mixer while standing near the mixer. As the video progresses, a user may mark the video at the points where the selected actions occur, after which the program, in step 68, performs a statistical analysis of the sensor data for the corresponding time periods and displays the calculated statistics for each behavior category. The program preferably provides for selection of one or more marker titles from among those entered in the dialog box, and calculates and displays statistics for the data coinciding with the particular set of selected behaviors.

Step 68 may be initiated by user action, e.g., clicking a button such as the button labeled "Scan Event IDs" in FIG. 3. The program may provide for stepwise display of video/data segments, e.g., one segment for each mouse click, or may provide for sequential display of all relevant video/data segments in response to a single click. Steps 64–68 may be repeated at the user's option, e.g., to select different behaviors as the basis for analysis of the data. However, if the user elects to stop (step 70), all windows are automatically closed in step 72 and the program stops running. The video-driven display feature helps correlate actions and behaviors in the video to the sensor data.

In the data-driven mode of operation, the program loads saved data only (step 74) and displays it on a graph panel or panels (step 76). The user specifies thresholds for data values in step 78, e.g., in spaces provided in a dialog box such as that of FIG. 3 for upper and lower limits of a desired scan range. In response to, for example, the click of a button such as the "Scan Range" button shown in the FIG. 3, the program then loads the portions of the stored video corresponding in time, based on the time stamps, to the data lying outside the specified range (step 80) and displays the matching video and data (step 82). The program is thus capable of jumping, preferably forward or backward, from one video clip to the next video clip that coincides with data values beyond the set threshold. This action may occur in steps in response to individual mouse clicks, for example, or automatically for all such video clips in the data set. The program may also provide manual rewind and fast forward capability.

The statistics for the sensor data outside the specified range are calculated and displayed in step 84, after which the user may elect to change the thresholds and initiate another search of the data set. The system thus provides a rapid way to dynamically change the search to check data for various thresholds. The program may be adapted to display the relevant results only for data values above the upper limit, or only for data values below the lower limit, or both. In certain embodiments, the program is adapted to display the video for a user-selectable time period before and/or after any data value beyond threshold. In response to a user command after completion of data-driven analysis (step 86), the program automatically closes all windows (step 72).

The present invention eliminates barriers which minimize the efficiency and effectiveness of today's data acquisition methods. The system allows data to be observed in real time anywhere in the world through an Internet connection while multiple data/video collection points can be located anywhere within the range of an Internet wireless access point. During observation and playback, video is displayed in synchronization with data. As observations and playback occur, running statistics and review options are available to perform quantitative analysis of the acquired data. The video component allows the user to understand visually what is occurring during data acquisition. The system makes it easy to parse the data by dynamically cataloging events (such as fugitive emissions, process controls and work practices). These features provide meaningful information to aid in making effective decisions to understand and control these events.

While the invention has been illustrated and described in detail in the drawings and foregoing description, the same is to be considered as illustrative and not restrictive in character, it being understood that only preferred embodiments has been shown and described and that all changes and modifications that come within the spirit of the invention are desired to be protected.

We claim:

1. A real-time wireless video exposure monitoring system, comprising:
   an exposure monitor located at a field site for detecting the level of an environmental contaminant, said exposure monitor having a serial data port;
   a wireless bridge connected to said serial port for real-time wireless transmission of contaminant level data from said exposure monitor to a wireless Internet access point;
   a network video camera located at said field site;
   wireless video connection means for transmitting video images from said video camera in real time to said wireless Internet access point; and
   a client computer adapted to connect via the Internet to said wireless bridge and said wireless video connection means so as to receive said real-time contaminant level data and said real-time video, said client computer including real-time data and video recording and analysis means, and means for continually calculating the mean and standard deviation of said real-time data based on the previous mean and standard deviation values and the most recently received real-time data value.

2. The system of claim 1, wherein said client computer is adapted to receive and time-stamp real-time data from said exposure monitor and substantially simultaneously receive and time-stamp real-time video from said network camera, said client computer further adapted to provide a live display of said real-time data and video.

3. A real-time wireless video exposure monitoring system, comprising:
   an exposure monitor located at a field site for detecting the level of an environmental contaminant, said exposure monitor having a serial data port;

a wireless bridge connected to said serial port for real-time wireless transmission of contaminant level data from said exposure monitor to a wireless Internet access point;

a network video camera located at said field site;

wireless video connection means for transmitting video images from said video camera in real time to said wireless Internet access point; and a client computer adapted to connect via the Internet to said wireless bridge and said wireless video connection means so as to receive said real-time contaminant level data and said real-time video, said client computer including real-time data and video recording and analysis means;

wherein said client computer is adapted to receive and time-stamp real-time data from said exposure monitor and substantially simultaneously receive and time-stamp real-time video from said network camera, said client computer further adapted to provide a live display of said real-time data and video;

further comprising means within said client computer for continually calculating the mean and standard deviation of said real-time data based on the previous mean and standard deviation values and the most recently received real-time data value.

4. The system of claim 3, wherein said client computer includes video-driven means for performing behavior-based statistical analysis of data from said exposure monitor, said video-driven means including means for designating a plurality of worker actions, means for marking points in said video corresponding to said worker actions, and means for calculating and displaying statistics for the data coinciding with a particular set of selected worker actions.

5. The system of claim 4, wherein said client computer further includes data-driven means for identifying and displaying segments of said video coinciding with values of said real-time data exceeding a user-selectable threshold.

6. A method of remotely monitoring exposure to particulates in a pharmaceutical processing plant in real time, comprising:

locating a particulate sensor in proximity to a potential source of particulates in a pharmaceutical processing plant;

supplying real-time particulate level data in serial form from said particulate sensor to a serial-to-wireless bridge in proximity thereto;

locating a network video camera in position to view said potential source of particulates, said network camera provided with a wireless video connection;

connecting a remotely located monitoring computer to the Internet;

transmitting video from said video camera along with said particulate level data in real time to a wireless Internet access point and therefrom on the Internet to said monitoring computer;

further comprising the step of continually calculating the mean and standard deviation of said real-time particulate level data based on the previous mean and standard deviation values and the most recently received real-time data value.

7. The method of claim 6, wherein the following acts are performed substantially simultaneously:

a) receiving and time-stamping said real-time particulate level data;

b) receiving and time-stamping said real-time video from said network camera; and c) providing a live display of said real-time particulate level data and video.

8. A method of remotely monitoring exposure to particulates in a pharmaceutical processing plant in real time, comprising:

locating a particulate sensor in proximity to a potential source of particulates in a pharmaceutical processing plant;

supplying real-time particulate level data in serial form from said particulate sensor to a serial-to-wireless bridge in proximity thereto;

locating a network video camera in position to view said potential source of particulates, said network camera provided with a wireless video connection;

connecting a remotely located monitoring computer to the Internet; and transmitting video from said video camera along with said particulate level data in real time to a wireless Internet access point and therefrom on the Internet to said monitoring computer;

wherein the following acts are performed substantially simultaneously:

a) receiving and time-stamping said real-time particulate level data;

b) receiving and time-stamping said real-time video from said network camera; and c) providing a live display of said real-time particulate level data and video;

further comprising the step of continually calculating the mean and standard deviation of said real-time particulate level data based on the previous mean and standard deviation values and the most recently received real-time data value.

9. The method of claim 8, further comprising the step of performing behavior-based statistical analysis of said particulate level data, said behavior-based statistical analysis including designating a plurality of worker actions, marking points in said video corresponding to said worker actions, and calculating and displaying statistics for the particulate level data coinciding with a particular set of selected worker actions.

10. The method of claim 9, further comprising the step of identifying and displaying segments of said video coinciding with values of said real-time particulate level data exceeding a user-selectable threshold.

11. The system of claim 1, wherein said client computer includes video-driven means for performing behavior-based statistical analysis of data from said exposure monitor, said video-driven means including means for designating a plurality of worker actions, means for marking points in said video corresponding to said worker actions, and means for calculating and displaying statistics for the data coinciding with a particular set of selected worker actions.

12. The system of claim 1, wherein said client computer further includes data-driven means for identifying and displaying segments of said video coinciding with values of said real-time data exceeding a user-selectable threshold.

13. The method of claim 6, further comprising the step of performing behavior-based statistical analysis of said particulate level data, said behavior-based statistical analysis including designating a plurality of worker actions, marking points in said video corresponding to said worker actions, and calculating and displaying statistics for the particulate level data coinciding with a particular set of selected worker actions.

14. The method of claim 6, further comprising the step of identifying and displaying segments of said video coinciding with values of said real-time particulate level data exceeding a user-selectable threshold.

* * * * *